United States Patent [19]

Jelinek

[11] 4,026,565

[45] May 31, 1977

[54] SEALED STATIC JOINT AND GASKET THEREFOR

[75] Inventor: Jerry G. Jelinek, La Habra, Calif.

[73] Assignee: Parker-Hannifin Corporation, Cleveland, Ohio

[22] Filed: Mar. 10, 1975

[21] Appl. No.: 556,794

[52] U.S. Cl. ............................ 277/180; 277/235 B; 285/368

[51] Int. Cl.² .................. F16J 15/02; F16L 19/02

[58] Field of Search ........... 277/180, 235 B, 235 R; 285/368, 364, 166, 211

[56] References Cited

UNITED STATES PATENTS

| | | | |
|---|---|---|---|
| 2,880,019 | 3/1959 | Wurtz | 277/235 |
| 3,195,906 | 7/1965 | Moyers | 277/235 |
| 3,342,501 | 9/1967 | Meyer | 277/180 |
| 3,448,986 | 6/1969 | Jelinek et al. | 277/180 |
| 3,494,625 | 2/1970 | Sweger | 277/235 |
| 3,531,133 | 9/1970 | Sheesley et al. | 277/180 |
| 3,573,872 | 4/1971 | Sannes | 277/235 |
| 3,603,602 | 9/1971 | Padula | 277/235 |

Primary Examiner—Richard E. Aegerter
Assistant Examiner—L. Footland
Attorney, Agent, or Firm—John N. Wolfram

[57] ABSTRACT

A static joint in which stationary members are sealed by a gasket and wherein the gasket has a first member of elastomeric deformable material and a second member of rigid material, the deformable member having a sealing portion and a retainer portion, the rigid member being embedded within the retaining portion and of a height more than 60% of the height of the retaining portion to limit deformation of the first member. The rigid member is chemically bonded to the elastomeric member to inhibit movement or extrusion of the elastomeric material from between the rigid member and the members being sealed under heavy clamping pressure.

8 Claims, 7 Drawing Figures

SEALED STATIC JOINT AND GASKET THEREFOR

BACKGROUND OF THE INVENTION

Joints between members stationary relative to each other and having fluid flow passages of various cross section configurations generally require planar gaskets of circumferential outline generally similar to such cross section's configuration. When such gaskets comprise a member of elastomeric material it is frequently desirable that they also be provided with a member of rigid material to stiffen the gasket for ease in handling and also to provide a built-in stop to limit axial compression that may be applied to the deformable portion by the members being sealed. Heretofore rigid members for this general purpose have been made by machining or stamping operations that have not only been costly but result in wasted material. Also, when the rigid member is embedded within the elastomeric material it is desirable to prevent extrusion of elastomeric material between the rigid member and the members being sealed.

SUMMARY OF THE INVENTION

The present invention provides a static joint between members that are stationary relative to each other in the completed installation and also provides a gasket for such a joint. The gasket has a first member of deformable elastomeric material with a sealing portion and a retainer portion and also has a second member of rigid material either embedded solely in the retainer portion or chemically bonded to the retainer portion. The second member is of either circular or generally square cross section so that it may be cheaply made of drawn metal wire whereby machining or stamping operations are avoided. The rigid member has a height in an axial direction generally perpendicular to the plane of the gasket that is between 60 and 100% of the height of the retainer portion in the same axial direction.

The invention is of particular advantage in making gaskets of irregular outline and/or of large size. For example, such gaskets may involve dimensions as much as six feet across. To make machined or stamped metal members for such large size gaskets would require very large presses or milling machines. The present invention eliminates the need for such large manufacturing equipment because the rigid reinforcement may be readily formed from wire stock.

DETAILED DESCRIPTION

Figure 1:
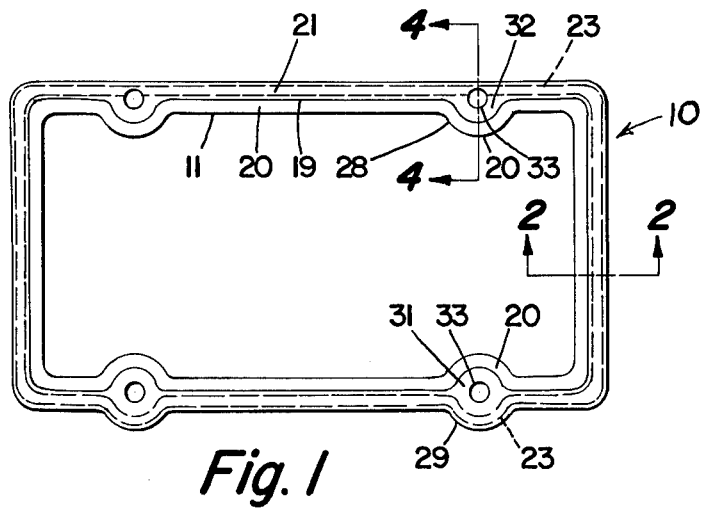
FIG. 1 is a plan view of one form of the gasket.
Figures 2, 3, 4:
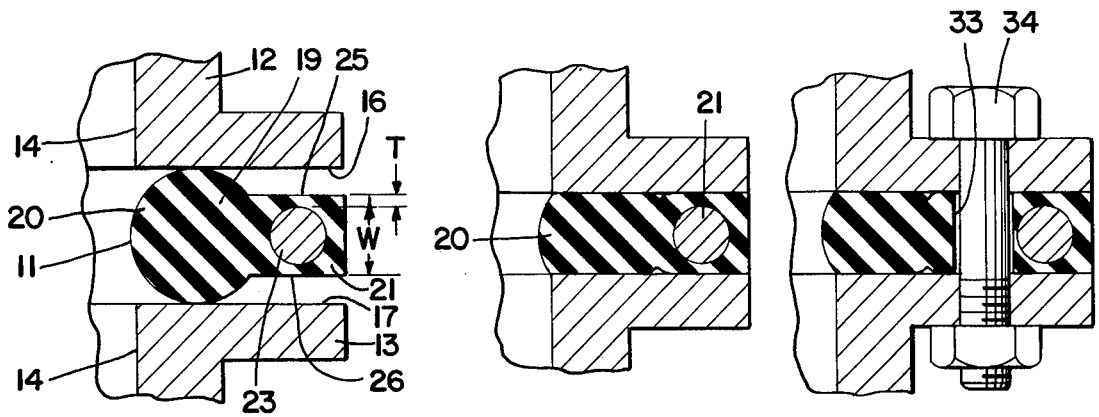
FIG. 2 is a fragmentary cross section view on the lines 2—2 of FIG. 1 showing one form of the gasket in an undeformed condition between members to be sealed.
FIG. 3 is a view like FIG. 2 showing the gasket in deformed condition.
FIG. 4 is a view like FIG. 3 but on lines 4—4 of FIG. 1.

In the form of the invention shown in FIGS. 1 through 4 the gasket 10 is circumferentially continuous with a central opening 11 that in this instance is generally rectangular but which may be circular or of any other desired shape to generally conform with an opening 14 in one or both members 12 and 13 (FIG. 2) which have opposed flat faces 16, 17 that are to be sealed.

Gasket 10 includes a first member 19 of deformable elastomeric material that has a sealing portion 20 and a retainer portion 21 and a second member 23 of rigid material such as metal or plastic and which in this form of the gasket is circular in cross section and is completely embedded within the retainer portion 21 and preferably is chemically bonded to the elastomeric material. Such chemical bonding may be accomplished, for example, by applying a coating of a bonding agent, such as Chemlok 203 or Chemlok 220 manufactured by Hughson Chemical Company, a division of Lord Corporation, to rigid member 23 just prior to molding of the elastomeric material thereabout.

Sealing portion 20 initially has a surface circular in cross section that intersects and extends beyond both the upper and lower flat faces 25, 26 of retainer portion 21 in directions along an axis of the gasket perpendicular to the general plane of the gasket. Member 23 is of a cross section diameter that is preferably about 80% of the axial distance between faces 25, 26 but which in any case is at least 60% of such distance. Thus, for example, for a gasket in which the axial thickness W of retainer portion 21 is initially 0.130 inch (0.3302 centimeters) the cross section diameter of rigid member 23 may be 0.1055 inch (0.268 centimeters), with the cross section diameter of the rigid member being 81% of elastomeric thickness W. In this case the thickness T of elastomeric material is about 0.0122 inch (0.031 centimeters).

At spaced circumferential intervals the gasket has transverse enlargements which may be in the form shown at 28 in FIG. 1 or as shown at 29. In either case the retainer portion 21 is transversely widened as at 31 or 32 and provided with an axially extending hole 33 therethrough to accept a bolt 34 for clamping members 12, 13 together with the gasket therebetween. At the widened portion 31 the rigid member 23 and sealing portion 20 are deflected to pass around the hole 33 on opposite sides thereof but at widened portion 32 only the sealing portion 20 is deflected to pass the bolt hole.

When the gasket of FIGS. 1–4 is placed between members 12, 13 and bolts 34 are tightened, sealing portion 20 will be deformed and reduced in axial thickness until faces 16, 17 engage retainer faces 25, 26. Thereafter there may be slight additional deformation and thinning of sealing and retaining portions 20, 21 but rigid member 23 will substantially prevent further deformation and thinning of the elastomeric member 19 except under excessive tightening of the bolts. In the latter case the gasket may be damaged by displacing the material of the retainer that is axially between the member 23 and faces 25, 26 so that faces 16 and 17 will directly contact member 23 and sever the transversely outer portion of retainer 21 from the transversely inner portion thereof but nevertheless member 23 will limit axial deformation of the elastomeric member 19 to substantially the cross section diameter of member 23 to prevent damage to the sealing portion. During tightening of the bolts and after members 12 and 13 have come into contact with faces 25, 26 the small thickness T and the chemical bonding of the elastomeric material to rigid member 23 will provide very high resistance to displacement of the elastomeric material between rigid member 23 and members 12, 13 so that considerable over tightening is required before such displacement occurs.

Figures 5, 6, 7:
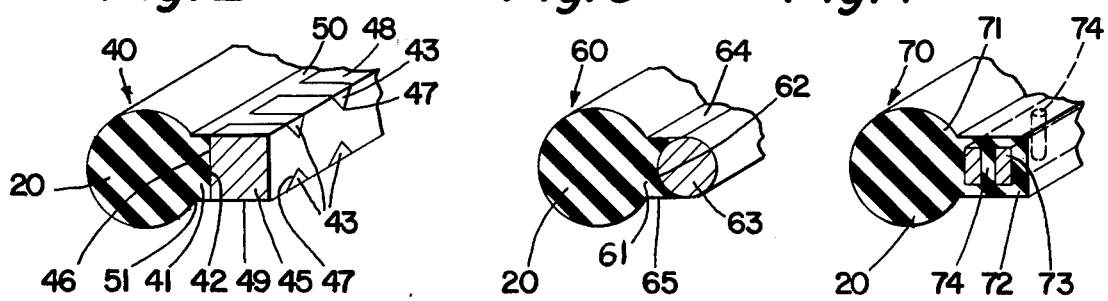
FIGS. 5, 6 and 7 are fragmentary perspective views of modified forms of the gasket.

In the form of gasket shown in FIG. 5 the elastomeric member 40 has a sealing portion 20 corresponding to the sealing portion of FIGS. 1–4 but the retainer portion 41 has a flat peripheral face 42 and a series of laterally outwardly extending and circumferentially spaced tongues 43 on axially opposite sides of retainer portion 41. The rigid member 45 in this case is substantially square in cross section with a transversely inner flat face 46 against face 42 and bonded thereto by Chemlok 203 or 220. Tongues 43 are received in complementary machined grooves or punched notches 47 in the opposite end faces 48, 49 of member 45 which are co-planar with opposite end faces 50, 51 of retainer portion 41. Thus, because of tongue 43, member 45 is, in a sense, embedded within retainer 41 but there will be essentially no thinning of the retainer in an axial direction when the gasket of FIG. 5 is assembled in the joint. In a modification of this form of the invention tongues 43 and grooves 47 may be omitted and the chemical bonding of surfaces 42, 46 relied upon for holding the rigid member and elastomeric member together as a unitary assembly.

In the form of the invention shown in FIG. 6 the elastomeric member 60 has a sealing portion 20 like that of FIGS. 1–4 but the retainer portion 61 has a concave transversely outer surface 62 that corresponds in curvature to the cross section curvature of a rigid member 63 of circular cross section. The cross section diameter of member 63 is the same as the axial thickness of retainer 61 between its upper and lower faces 64, 65. Member 63 fits against concave surface 62 to be at least partially embedded within retainer 61 and is chemically bonded thereto.

In FIG. 7 gasket 70 has an elastomeric member 71 with a sealing portion 20 and a retainer portion 72 into which a rigid member 73 is completely embedded and chemically bonded. In this case, member 73 is square in cross section and has axially extending circumferentially spaced holes 74 therethrough into which elastomeric material extends to further lock the rigid member in place within retainer portion 72.

I claim:

1. A gasket for sealing the joint between a pair of members having opposed surfaces for contacting axially opposite sides of the gasket, said gasket comprising a first member of readily deformable material and a second member of relatively rigid material, said first member being continuous so as to form a closed loop and including a sealing portion and a retainer portion, said retainer portion being solely on one side of the sealing portion and having substantially flat and parallel axial end faces, said retainer portion being of substantially uniform thickness between said end faces, said sealing portion being devoid of grooves and projecting axially beyond both said axial end faces of said retainer portion, the surface of said sealing portion intersecting said axial ends of said retainer portion such that an axial line through the intersections is radially spaced from the second member, said second member being carried by said retainer portion completely exteriorly of said sealing portion and having a length in said axial direction that is at least 60% of the length of said retainer portion in said axial direction but which is no greater than the minimum distance between opposite ends of said first member.

2. The gasket of claim 1 in which the second member is completely embedded within the retainer portion and chemically bonded thereto.

3. A gasket for sealing the joint between a pair of members having opposed surfaces for contacting axially opposite ends of the gasket, said gasket comprising a first member of readily deformable material and a second member or relatively rigid material, said first member being continuous so as to form a closed loop and comprising transversely adjacent sealing and retainer portions, said sealing portion extending beyond said retainer portion in both axial directions and intersecting the axial end faces of said retainer portion, said second member being carried by said retainer portion and being substantially coextensive therewith, an axial opening through said retainer portion, said second member where it passes said opening being on one transverse side thereof, and said seal portion where it passes said opening being on the other transverse side thereof.

4. The gasket of claim 3 in which said second member is completely embedded in said retainer portion and has an axial thickness of at least 80% of the axial thickness of said retainer portion.

5. The gasket of claim 3 in which said retainer has an enlarged portion in the transverse direction and said opening is located solely in said enlarged portion.

6. A gasket for forming a static sealed joint between a pair of members having opposed sealing surfaces axially movable toward each other, said gasket including a first member of deformable elastomeric material and a second member of relatively rigid material, said first member having a sealing portion and a retainer portion, said retainer portion having substantially flat and parallel axial end faces and being transversely adjacent said sealing portions, said sealing portion extending axially beyond said faces, said second member being carried within the retainer portion and having a cross section thickness in the axial direction that is at least 60% but less than 100% of the cross section thickness in the axial direction of said retainer portion, said retainer portion having a thin section at each of its ends that transversely overlies said second member and whose axial thickness is no more than 20% of said cross section thickness of said retainer portion, and said second member and said thin sections being effective to limit the axial travel of said surfaces toward each other to a distance that is substantially the same as the axial cross section dimension of said retainer portion, the surface of said sealing portion intersecting said axial ends of said retainer portion such that an axial line through the intersections is radially spaced from the second member, said cross section thickness of the retainer portion being no greater than the minimum distance between opposite ends of said first member, said retainer portion having an axial opening therethrough, the second member where the latter passes said opening being on one transverse side of said opening, and said sealing portion extends past said opening on the other transverse side thereof.

7. A gasket for forming a static sealed joint between a pair of members having opposed sealing surfaces axially movable toward each other, said gasket including a first member of deformable elastomeric material and a second member of relatively rigid material, said first member having a sealing portion devoid of grooves and a retainer portion, said retainer portion having substantially flat and parallel axial end faces and being transversely adjacent said sealing portion, said sealing portion extending axially beyond said faces, said second member being carried by the retainer portion and having a cross section thickness in the axial direction that is at least 60% but less than 100% of the cross section thickness in the axial direction of said retainer portion, said retainer portion having a thin section at each of its ends that transversely overlies said second member and whose axial thickness is no more than 20% of said cross section thickness of said retainer portion, said second member and said thin sections being effective to limit the axial travel of said surfaces toward each other to a distance that is substantially the same as the axial cross section dimension of said retainer portion, said second member being completely embedded within said retainer portion and said retainer portion is chemically bonded to said second member.

8. The gasket of claim 7 in which said axial cross section thickness of said second member is about 80% of the axial thickness of the retainer portion and said thin sections together constitute about 20% of the axial thickness of the retainer portion.

* * * * *